United States Patent
Sunaga et al.

[11] Patent Number: 6,063,725
[45] Date of Patent: *May 16, 2000

[54] OLEFIN POLYMERIZATION CATALYST SYSTEM

[75] Inventors: Tadahiro Sunaga; Yukio Ishii; Tadashi Asanuma, all of Osaka, Japan

[73] Assignee: Mitsui Chemicals, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/743,374

[22] Filed: Nov. 4, 1996

[30] Foreign Application Priority Data

Nov. 7, 1995 [JP] Japan ................................. 7-288299
Mar. 21, 1996 [JP] Japan ................................. 8-064576

[51] Int. Cl.[7] ............................................. B01J 31/00
[52] U.S. Cl. .................. 502/109; 502/117; 502/125; 502/127; 502/159; 526/201; 526/203
[58] Field of Search ....................... 502/109, 124, 502/125, 128, 127, 159

[56] References Cited

U.S. PATENT DOCUMENTS

| | | | |
|---|---|---|---|
| 5,057,475 | 10/1991 | Canich | 502/104 |
| 5,362,824 | 11/1994 | Furtek et al. | 526/114 |
| 5,587,439 | 12/1996 | DiMaio | 526/142 |

FOREIGN PATENT DOCUMENTS

| | | |
|---|---|---|
| 2435609 | 2/1975 | Germany . |
| 7-53620 | 2/1995 | Japan . |
| 7-133306 | 5/1995 | Japan . |
| 8-59728 | 3/1996 | Japan . |
| 8-127610 | 5/1996 | Japan . |
| 1477825 | 6/1977 | United Kingdom . |
| 2022102 | 12/1979 | United Kingdom . |
| WO94/20545 | 9/1994 | WIPO . |
| WO95/23816 | 9/1995 | WIPO . |
| WO96/11961 | 4/1996 | WIPO . |
| WO96/30122 | 10/1996 | WIPO . |

OTHER PUBLICATIONS

Bochkin et al, *Polymer Science USSR*, "Polymerization of Ethylene Under the Influence of Ti/Mg Catalysts Immobilized on Polymer Carriers", vol. 29, No. 7, 1987, pp. 1485–1491, XP000020420.

Chemical Abstracts, vol. 92, No. 2, 1980, Columbus, OH, Abstract No. 7200y, Costache: "Polymerizing and Copolymerizing Olefins", p. 19, col. 1, XP00204809 *Abstract*.

Polymer Science USSR, vol. 22, 1980, Oxford, pp. 372–382, XP002024808, Kabanov: "Gel Immobilized Complexed Metal Catalysts for the Polymerization of Ethylene".

*Primary Examiner*—David W. Wu
*Assistant Examiner*—Roberto Rabago
*Attorney, Agent, or Firm*—Burns, Doane, Swecker, & Mathis, L.L.P.

[57] ABSTRACT

An olefin polymerization catalyst system comprising an organic transition metal compound and a support, wherein an organic transition metal compound is soluble in an inert organic solvent and a support which is insoluble in the inert organic solvent, and the support comprises an organic high molecular weight compound which contains a specific carbonyl-containing group. The catalyst system can polymerize an olefin in a high activity, provides polymer with high stereoregularity, prevents adhesion or fouling of the polymer generated in the course of polymerization or an organic aluminum oxy compound on the inner wall of the reactor, leads to high bulk density of the polymer and very reduced level of fisheye and/or gel generation on the processed item, can maintain high productivity, can manufacture high quality product, and thus provides extremely high contribution in industry.

9 Claims, No Drawings

OLEFIN POLYMERIZATION CATALYST SYSTEM

BACKGROUND OF THE INVENTION (1) Field of the Invention

The invention relates to a catalyst system used for an olefin polymerization. More specifically, the invention relates to an olefin polymerization catalyst system comprising a specific transition metal compound and a specific support.

(2) Description of the Prior Art

In recent years, transition metal compounds which are soluble in inert organic solvents (catalyst for a homogenous system) have been the focused of attention as olefin polymerization catalysts. Specifically, in these catalysts, so-called metallocene compounds have been well-known. The process for polymerizing olefin by using these metallocene compounds, particularly the process for stereoregularly polymerizing α-olefin has been subjected to many improvements since the report of W. Kaminsky et al. (Japan Laid-Open SHO 58-19309; Angew. Chem., 97,507 (1985)).

In the slurry polymerization process for polymerizing olefin in an inert hydrocarbon by using the metallocene compound and an organic aluminum oxy compound as a catalyst, bulk polymerization process for polymerizing in a liquefied olefin monomer, or gas phase polymerization process for polymerizing in a gaseous olefin monomer, the polymer or an organic aluminum oxy compound which is formed in the course of polymerization adheres on the inner wall of the reactor, causes reduction of heat-removing capacity, further forms blocks in the reactor, and leads to troubles for the steady operation of polyolefin manufacturing facilities. Additionally, the polymer formed has a very small particle size, low bulk density, and problem of markedly lowering productivity.

In order to overcome these problems, a process for polymerizing olefin in the presence of a catalyst which is prepared by supporting an organic aluminum oxy compound on silica gel, alumina and other inorganic oxides and bringing it into contact with the metallocene compound, has been described in Japan Laid-Open SHO 60-35006, 61-108610, 61-296008, 63-66206 and HEI 2-173104. These inorganic oxides generally have an acid hydroxyl group on the surface and the catalyst is supported on the support by bringing the hydroxyl group into contact with the organic aluminum oxy compounds or metallocene compounds.

However, when polyolefin is prepared by using a catalyst obtained by supporting a metallocene compound and/or organic aluminum oxy compound on an inorganic oxide such as the above obtained silica gel and alumina, relatively hard inorganic materials such as silica gel support or alumina support remain in the formed item, act as a foreign matter, and results in development of fisheyes. Such phenomenon lowers the value of the product and additionally leads to clogging of the filter which is mounted on the molding machine, melt kneading machine and granulating machine, and renders steady operation difficult in industry.

Polyolefin prepared in the presence of an olefin polymerization catalyst obtained by supporting the organic aluminum oxy compound and/or metallocene compound on the above inorganic compound support, polypropylene in particular, leads to very low stereoregularity as compared with polyolefin prepared by using a homogeneous polymerization catalyst without support. Further, properties such as stiffness, impact resistance and heat resistance are lowered and generate a large problem with quality.

Activity improvement of olefin polymerization catalyst by modifying the organic aluminum oxy compound has been tried. For example, Japan Laid-Open HEI 2-78687 has disclosed a process for using a catalyst comprising metallocene compound and a benzene insoluble organic aluminum oxy compound obtained by bringing an organic aluminum oxy compound into contact with an active hydrogen containing compound. Japan Laid-Open HEI 7-53619 and 7-53620 have described a process for modifying the organic aluminum oxy compound by an organic compound such as ketoalcohol or β-diketone.

Further, as to the process for modifying the organic aluminum oxy compound. Japan Laid-Open HEI 7-53620 has described a process for using a catalyst comprising a metallocene compound and the addition reaction product of an organic phosphorus compound having a specific structure and the organic aluminum oxy compound, in order to improve catalyst activity and simultaneously to prevent adhesion of formed polymer on the inner surface of the reactor.

However, these processes can not fully prevent the adhesion of polymer formed in the polymerization on the surface of the reactor.

SUMMARY OF THE INVENTION

The object of the invention is to provide an olefin polymerization catalyst system which can prepare polyolefin in high activity and high stereoregularity, is free from adhesion of polymer formed in the course of polymerization reaction or of the organic aluminum oxy compound on the inner wall of the reactor, can lead to a high bulk density of the polymer, can maintain high productivity, and improve fish eye and/or gel generation level in the product.

As a result of an intensive investigation on the desired olefin polymerization catalyst system in order to solve the above subject, the present inventors have accomplished the invention.

That is, one aspect of the invention is a polymerization catalyst system comprising an organic transition metal compound and a support, the organic transition metal compound is soluble in an inert organic solvent, the support is insoluble in the inert organic solvent and the support comprises an organic high molecular compound containing a carbonyl containing group represented by the general formula [1]:

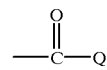

[1]

wherein Q is selected from hydrogen, hydroxy, alkyl, aryl, alkoxy, aryloxy, oxycarbonyl, halogen, amino, aminocarbonyl, hydrazino or oxyanion.

DESCRIPTION OF THE PREFERRED EMBODIMENT

The olefin polymerization catalyst system of the invention will hereinafter be illustrated in detail.

In the invention, the term "soluble or insoluble in an inert organic solvent" means that an organic transition metal compound and a support have the following property.

In the invention, the organic transition metal compound component and a support component are previously brought into contact with each other to prepare the catalyst and successively applied to polymerization. The term "soluble or insoluble in the inert organic solvent" means that, prior to mutual contact of these components, each component has the property of being individually soluble or insoluble in the inert organic solvent for use in the preparation of the catalyst. That is, the term means that, before contact of these two components, the organic transition metal compound is singly soluble in the inert organic solvent and the support is singly insoluble in the inert organic solvent.

The inert organic solvent in the invention is alkane having 1–20 carbon atoms, aromatic hydrocarbon having 6–20 carbon atoms, ether having 2–20 carbon atoms or halogenated hydrocarbon having 1–20 carbon atoms.

Exemplary alkanes which can be used include methane, ethane, propane, butane, pentane, heptane, octane, isobutane, neopentane, cyclopentane, cyclohexane and decalin.

Representative aromatic hydrocarbons which can be used include benzene, toluene and xylene.

Specific ethers include diethyl ether, tetrahydrofuran, 1,2-dimethoxy ethane and dioxane.

Halogenated hydrocarbons include, for example, dichloromethane, and chloroform.

These inert organic solvents can be used singly or as a mixture.

The organic transition metal compound which is soluble in the inert organic solvent in the invention is the organic transition metal compound which is soluble in the inert organic solvent of the invention is a compound which includes a transition metal of the group 3–8 according to the periodic table on the front cover of "Chemical Dictionary, Edited by Tokyo Kagaku Dojin (1994). No particular restriction is imposed upon the transition metal compound so long as the compound can polymerize olefin by using the organic aluminum oxy compound as a co-catalyst or catalyst activating agent. Particularly preferred metallocene compound is represented by the general formula [2] or general formula [3]:

[2]

wherein $A^1$ and $A^2$ are a cyclopentadienyl group, indenyl group, or fluorenyl group, one of $A^1$ and $A^2$ can be amino group, and two adjacent groups can be directly bonded to each other to form a cyclic hydrocarbon substituent; further a portion or all of the hydrogen atoms on these groups can be substituted with a substituent selected from alkyl having 1–20 carbon atoms, aryl having 6–20 carbon atoms, alkoxy having 1–20 carbon atoms, aryloxy having 6–20 carbon atoms and silicon containing alkyl having 1–20 carbon atoms; M is a metal selected from the group 4 in the periodic table; and $X^1$ and $X^2$ are selected from halogen, alkyl having 1–20 carbon atoms or anion ligand

[3]

wherein $A^3$ and $A^4$ are a cyclopentadienyl group, indenyl group, or fluorenyl group, one of $A^3$ and $A^4$ can be an amino group, and two adjacent groups can be directly bonded to each other to form a cyclic hydrocabon substituent; further, a portion or all of the hydrogen atoms on these groups can be substituted with a substituent selected from alkyl having 1–20 carbon atoms, aryl having 6–20 carbon atoms, alkoxy having 1–20 carbon atoms, aryloxy having 6–20 carbon atoms and silicon containing alkyl having 1–20 carbon atoms; $A^3$ and $A^4$ can be the same or differ from each other; M is a metal selected from the group 4 in the periodic table; Y is selected from $—CR^1R^2—$, $—CR^1R^2—CR^3R^4—$, or $SiR^1R^2—$ wherein $R^1$, $R^2$, $R^3$ or $R^4$ are selected from hydrogen, alkyl having 1–20 carbon atoms, aryl having 6–20 carbon atoms, alkoxy having 1–20 carbon atoms, aryloxy having 6–20 carbon atoms or silicon containing alkyl having 1–20 carbon atoms, and $R^1$, $R^2$, $R^3$, and $R^4$ can be the same or differ each other; $X^1$ and $X^2$ are selected from halogen, alkyl having 1–20 carbon atoms or anion ligand.

In the above general formulas [2] and [3], the alkyl groups having 1–20 carbon atoms include, for example, methyl, ethyl, propyl, butyl, isopropyl, tert-butyl, neopentyl, cyclopentyl, cyclohexyl and menthyl group. Exemplary aryl groups having 6–20 carbon atom include phenyl, tolyl and naphthyl groups.

Representative alkoxy groups having 1–20 carbon atoms include methoxy, ethoxy, propoxy, butoxy, isopropoxy, tert-butoxy, neopentoxy, cyclopentoxy, cyclohexyloxy, and menthoxy groups.

Aryloxy groups having 6–20 carbon atoms include, for example, phenoxy, tolyloxy, xylyloxy and naphthyloxy groups. Silicon containing alkyl groups having 1–20 carbon atoms include, for example, trimethylsilyl, dimethylethylsilyl, diphenylmethylsilyl, cyclohexyldimethylsilyl, triphenylsilyl, 2-(methyldiphenylsilyl)ethyl groups.

Further, each adjacent substituent can be directly bonded to form the same cyclic hydrocarbon substituent. Specifically, cyclopentane ring, cyclohexane ring, cycloheptane ring, benzene ring, naphthalene ring and derivatives of these rings are enumerated.

In the above general formulas [2] and [3], Y is $—CR^1R^2—$, $—CR^1R^2—CR^3R^4—$ or $—SiR^1R^2—$. Specifically, methylene, dimethylmethylene (or isopropylidene), diphenylmethylene, diphenylethylene, 1,2-dimethylethylene, 1,1,2,2-tetramethylethylene, dimethylsilyl and diphenylsilyl group are enumerated.

In the above general formulas [2] and [3], M is a metal selected from the group 4 of the periodic table and include, for example, titanium, zirconium, and hafnium. $X^1$ and $X^2$ are selected from halogen, alkyl group and anion ligand. Halogen is selected from fluorine, chlorine, bromine and iodine. Alkyl groups include, for example, methyl, ethyl, propyl and other straight alkyl groups; isopropyl and other branched alkyl groups; and cyclopropyl and other cyclic alkyl groups.

Exemplary anion ligands include trimethylphosphine, triethylphosphine, triphenylphosphine, diphenylmethylphosphine and other organic phosphorus compounds; methoxy, ethoxy, n-butoxy, sec-butoxy, tert-butoxy, phenoxy, naphthoxy and other alkoxy ligands; and tetrahydrofuran, diethyl ether, dioxane, 1,2-dimethoxyethane and other ether compounds.

Specific examples of metallocene compounds represented by the above general formulas [2] and [3] in the invention will be illustrated hereinafter. However, no particular restriction is imposed upon these compounds so long as the metallocene compounds can promote olefin polymerization.

Exemplary metallocene compounds represented by the above general formula [2] include bis(cylopentadienyl)- zirconium dichloride, bis(pentamethylcyclopentadienyl) zirconium dichloride, bis(indenyl)zirconium dichloride, bis(2-methylindenyl)zirconium dichloride, bis(fluorenyl)zirconium dichloride, bis(4-t-butylfluorenyl)zirconium dichloride, pentamethylcyclopentadienyl(di-t-butylamide) zirconium dichloride, bis(cyclopentadienyl) zirconiumdimethyl, bis(pentamethylcyclopentadienyl) zirconiumdimethyl, bis(indenyl)zirconiumdimethyl, bis(2-methylindenyl)zirconiumdimethyl, bis(fluorenyl) zirconiumdimethyl, bis(4-t-butylfluorenyl) zirconiumdimethyl, and petamethylcyclopentadienyl(di-t-butylamide)zirconiumdimethyl, and other metallocene compounds obtained by replacing zirconium of the above metallocene compounds with titanium or hafnium.

Examplary metallocene compounds represented by the general formula [3] include dimethylsilylbis(cyclopentadienyl)zirconium dichloride, dimethylsilylbis(tetramethylcyclopentadienyl)zirconium dichloride, dimethylsilylbis(methylcyclopentadienyl)zirconium dichloride, dimethylsilylbis(dimethylcyclopentadienyl) zirconium dichloride, dimethylsilyl(2,4-dimethylcyclopentadienyl) (3',5'-dimethylcyclopentadienyl) zirconium dichloride, dimethylsilyl(2,3,5-trimethylcyclopentadienyl)(2',4',5'-dimethylcyclopentadienyl)zirconium dichloride, dimethylsilylbis(t-butylcyclopentadienyl)zirconium dichloride, dimethylsilylbis(trimethylsilylcyclopentadienyl)zirconium dichloride, dimethylsilylbis(2-trimethylsilyl-4-t-butylcyclopentadienyl)zirconium dichloride, dimethylsilylbis(4,5,6,7-tetrahydro-indenyl)zirconium dichloride, dimethylsilylbis(indenyl)zirconium dichloride, dimethylsilylbis(2-methylindenyl)zirconium dichloride, dimethylsilylbis(2,4-dimethylindenyl)zirconium dichloride, dimethylsilylbis(2,4,7-trimethylindenyl)zirconium dichloride, dimethylsilylbis(2-methyl-4-phenylindenyl) zirconium dichloride, dimethylsilylbis(2-ethyl-4-phenylindenyl)zirconium dichloride, dimethylsilylbis(benz[e]indenyl)zirconium dichloride, dimethylsilylbis(2-methylbenz[e]indenyl)zirconium dichloride, dimethylsilylbis(benz[f]indenyl)zirconium dichloride, dimethylsilylbis(2-methylbenz[f]indenyl)zirconium dichloride, dimethylsilylbis(3-methylbenz[f]indenyl) zirconium dichloride, dimethylsilylbis(cyclopenta[cd] indenyl)zirconium dichloride, dimethylsilylbis(cyclopentadienyl)zirconium dimethyl, dimethylsilylbis(tetramethylcyclopentadienyl)zirconium dimethyl, dimethylsilylbis(methylcyclopentadienyl) zirconiumdimethyl, dimethylsilylbis(dimethylcyclopentadienyl)zirconium dimethyl, dimethylsilyl(2,4-dimethylcyclopentadienyl)(3',5'-dimethylcyclopentadienyl)zirconium dimethyl, dimethylsilyl(2,3,5-trimethylcyclopentadienyl)(2',4',5'-trimethylcyclopentadienyl)zirconium dimethyl, dimethylsilylbis(t-butylcyclopentadienyl) zirconiumdimethyl, dimethylsilylbis(trimethylsillcyclopentadienyl)zirconiumdimethyl, dimethylsilylbis(2-trimethylsilyl-4-t-butylcyclopentadienyl)zirconiumdimethyl, dimethylsilylbis(4,5,6,7-tetrahydro-indenyl)zirconiumdimethyl, dimethylsilylbis(indenyl)zirconiumdimethyl, dimethylsilylbis(2-methylindenyl)zirconiumdimethyl, dimethylsilyl-bis(2,4-dimethylindenyl)zirconiumdimethyl, dimethylsilylbis(2,4,7-trimethylindenyl)zirconiumdimethyl, dimethylsilylbis(2-methyl-4-phenylindenyl)zirconiumdimethyl, dimethylsilylbis(2-ethyl-4-phenylindenyl) zirconiumdimethyl, dimethylsilylbis(benz[e]indenyl) zirconium dimethyl, dimethylsilylbis(2-methylbenz[e] indenyl)zirconium dimethyl, dimethylsilylbis(3-methylbenz[e]indenyl)zirconium dimethyl, dimethylsilylbis(benz[f] indenyl)zirconium dimethyl, dimethylsilylbis(2-methylbenz[f]indenyl)zirconim dimethyl, dimethylsilylbis(3-methylbenz[f]indenyl)zirconium dimethyl, dimethylbis(cyclopenta[cd]indenyl)zirconium dimethyl, and other metallocene compounds obtained by replacing zirconium with titanium or hafnium; and further include isopropylidene (cyclopentadienyl-fluorenyl)zirconium dichloride, isopropylidene(cyclopentadienyl-indenyl)zirconium dichloride, isopropylidene(cyclopentadienyl-2,7-di-t-butylfluorenyl)zirconium dichloride, isopropylidene(cyclopentadienyl-3-methylfluorenyl)zirconium dichloride, isoropylidene(cyclopentadienyl-4-methylfluorenyl) zirconium dichloride, isopropylidene(cyclopentadienyl-octahydrofluorenyl)zirconium dichloride, isopropylidene(methylcyclopentadienyl- fluorenyl)zirconium dichloride, isopropylidene(dimethylcyclopentadienylfluorenyl) zirconium dichloride, isopropylidene(tetramethylcyclopentadienyl-fluorenyl)zirconium dichloride, or diphenylmethylene(cyclopentadienyl-fluorenyl)zirconium dichloride, diphenylmethylene(cyclopentadienyl-indenyl)zirconium dichloride, diphenylmethylene(cyclopentadienyl-2,7-di-t-butylfluorenyl)zirconium dichloride, diphenylmethylene(cyclopentadienyl-3-methylfluorenyl)zirconium dichloride, diphenylmethylene(cyclopentadienyl-4-methylfluorenyl) zirconium dichloride, diphenylmethylene(cyclopentadienyloctahydrofluorenyl)zirconium dichloride, diphenylmethylene(methylcyclopentadienyl-fluorenyl) zirconium dichloride, diphenylmethylene(dimethylcyclopentadienyl-fluorenyl)zirconium dichloride, diphenylmethylene(tetramethylcyclopentadienyl-fluorenyl) zirconium dichloride, or cyclohexylidene(cyclopentadienyl-fluorenyl)zirconium dichloride, cyclohexylidene(cyclopentadienylindenyl)zirconium dichloride, cyclohexylidene(cyclopentadienyl-2,7-di-t-butylfluorenyl) zirconium dichloride, cyclohexylidene(cyclopentadienyl-3-methylfluorenyl)zirconium dichloride, cyclohexylidene (cyclopentadienyl-4-methylfluorenyl)zirconium dichloride, cyclohexylidene(cyclopentadienyloctahydrofluorenyl) zirconium dichloride, cyclohexylidene(methylcyclopentadienylfluorenyl)zirconium dichloride, cyclohexylidene(dimethylcyclopentadienyl-fluorenyl) zirconium dichloride, cyclohexylidene(tetramethylcyclopentadienylfluorenyl)zirconium dichloride, or dimethylsilyl(cyclopentadienyl-fluorenyl) zirconium dichloride, dimethylsilyl(cyclopentadienyl-indenyl)zirconium dichloride, dimethylsilyl(cyclopentdienyl-2,7-di-t-butylfluorenyl)zirconium dichloride, dimethylsilyl(cyclopentadienyl-3-methylfluorenyl)zirconium dichloride, dimethylsilyl(cyclopentadienyl-4-methylfluorenyl)zirconium dichloride, dimethylsilyl(cyclopentadienyl-octahydrofluorenyl) zirconium dichloride, dimethylsilyl(methylcyclopentanedienyl-fluorenyl)zirconium dichloride, dimethylsilyl(dimethylcyclopentadienylfluorenyl)zirconium dichloride, dimethylsilyl(tetramethylcyclopentadienylfluorenyl)zirconium dichloride, or isopropylidene(cyclopentadienyl-fluorenyl) zirconium dimethyl, isopropylidene(cyclopentadienyl-indenyl)zirconiumdimethyl, isopropylidene(cyclopentadienyl-2,7-di-t-butylfluorenyl) zirconiumdimethyl, cyclohexylidene(cyclopentadienylfluorenyl)zirconiumdimethyl, cyclohexylidene(cyclopentadienyl-2,7-di-t-butylfluorenyl) zirconiumdimethyl, dimethylsilyl (cyclopentadienylfluorenyl)zirconiumdimethyl, dimethylsilyl(cyclopentadienyl-indenyl)zirconiumdimethyl, and dimethylsilyl(cyclopentadienyl-2,7-ditertbutylfluorenyl)zirconiumdimethyl and other metallocene compounds obtained by replacing zirconium of the above metallocene compounds with titanium or hafnium.

Exemplary metallocene compounds further include ethylenebis(indenyl)zirconium dichloride, ethylenebis(4,5,6,7-tetrahydroindenyl)zirconium dichloride, 1,2-dimethylethylidiyl-1,2-bis(indenyl)zirconium dichloride, 1,2-dimethylethylidiyl-1,2-bis(2'-methylindenyl)zirconium dichloride, 1,2-diisopropylethylidiyl-1,2-bis(indenyl)zirconium dichloride, 1,2-diisopropylethylidiyl-1,2-bis(2'-methylindenyl)zirconium dichloride, 1,2-dimethylethylidiyl-1,2-bis(3'-methylindenyl)zirconium dichloride, 1,2-dimethylethylidiyl-1,2-bis(4'-isoproylindenyl)zirconium dichloride, 1,2-dimethylethylidiyl-1,2-bis(4',7'-diisopropylindenyl)zirconium dichloride, 1,2-dimethylethylidiyl-1,2-bis(2'-methyl-4'-isopropylindenyl)zirconium dichloride, 1,2-dimethylethylidyl-1,2-bis(4'-cyclohexylindenyl)zirconium dichloride, 1,2-dimethylethylidiyl-1,2-bis(2'-methyl-4'-cyclohexylindenyl)zirconium dichloride, 1,2-dimethylethylidiyl-1,2-bis(4',7'-diphenyylindenyl)zirconium dichloride, 1,2-dimethylethylidiyl-1,2-bis(2'-methyl-4'-phenylindenyl)zirconiumdichloride, 1,2-dimethylethylidyl-1,2-bis(4'-naphthylindenyl)zirconium dichloride, 1,2-dimethylethylidiyl-1,2-bis(2'-methyl-4'-naphthylindenyl)zirconium dichloride, 1, 2-dimethylethylidiyl-1,2-bis(5'-phenylindenyl)zirconium dichloride, 1,2-dimethylethylidiyl-1,2-bis(4'-methoxyindenyl)zirconium dichloride, 1,2-dimethylethylidiyl-1,2-bis(benz[e]indenyl)zirconium dichloride, 1,2-dimethylethylidiyl-1,2-bis(2'-methylbenz[e]indenyl)zirconium dichloride, 1,2-dimethylethylidiyl-1,2-bis(3'-methylbenz[e]indenyl) zirconium dichloride, 1,2-dimethylethylidiyl-1,2-bis(benz[f] indenyl)zirconium dichloride, 1,2-dimethylethylidiyl-1,2-bis(2'-methylbenz[f]indenyl)zirconium dichloride, 1,2-dimethylethylidiyl-1,2-bis(3'-methylbenz[f]indenyl) zirconium dichloride, 1,2-dimethylethylidiyl-1,2-bis (cyclopenta[cd]indenyl)zirconium dichloride, or ethylenebis(indenyl)zirconiumdimethyl, ethylenebis(4,5,6,7-tetrahydroindenyl)zirconiumdimethyl, 1,2-dimethylethylidiyl-1,2-bis(2'-methyl-4'-isopropylindenyl)zirconiumdimethyl, 1,2-dimethylethylidiyl-1,2-bis(4',7'-diisopropylindenyl)zirconiumdimethyl, 1,2-dimethylethylidiyl-1,2-bis(2'-methyl-4'-phenylindenyl)zirconiumdimethyl, 1,2-dimethylethylidiyl -1,2-bis(2'-methyl-4'-naphthylindenyl)zirconiumdimethyl, 1,2-dimethylethylidiyl-1,2-bis(benz[e]indenyl)zirconiumdimethyl, 1,2-dimethylethylidiyl-1,2-bis(2'-methylbenz[e]indenyl)zirconiumdimethyl, and 1,2-dimethylethylidiyl-1,2-bis(3'-methylbenz[e]indenyl) zirconiumdimethyl, and other metallocene compounds obained by replacing zirconium of the above metallocene compounds with titanium or hafnium.

Still further compounds include ethylene(t-butylamide cyclopentadienyl)zirconium dichloride, ethylene (t-butylamidetetramethylcyclopentadienyl)zirconium dichloride, dimethylsily(t-butylamide-tetramethylcyclopentadienyl)zirconium dichloride, dimethylsilyl(t-butylamide-indenyl)zirconium dichloride, dimethylsilyl(t-butylamide-fluorenyl)zirconium dichloride (tetrahydrofuran), dimethylsilyl(t-butylamide-fluorenyl)zirconium dichloride (diethyl ether), ethylene(t-butylamide-cyclopentadienyl)zirconiumdimethyl, ethylene(t-butylamide-tetramethylcyclopentadienyl) zirconiumdimethyl, dimethylsilyl(t-butylamidetetramethylcyclopentadienyl)zirconiumdimethyl, dimethylsilyl(t-butylamide-indenyl)zirconiumdimethyl, dimethylsilyl(t-butylamide-fluorenyl)zirconium- dimethyl (tetrahydrofuran), and dimethylsilyl(t-butylamide-fluorenyl)zirconiumdiphenyl, and other metallocene compounds obtained by replacing zirconium of the above metallocene compounds with titanium or hafnium.

In the organic high molecular compound which is a support insoluble in the inert organic solvent of the invention and contains a carbonyl-containing group represented by the general formula [1], Q is selected from hydrogen, hydroxy, alkyl, aryl, alkoxy, aryloxy, oxycarbonyl, halogen, amino, aminocarbonyl, hydrazino and oxyanion group. The support which is insoluble in the inert hydrocarbon compound brings the organic aluminum oxy compound into contact with said organic high molecular compound. Specifically, when Q contains hydrogen or oxygen in the carbonyl-containing group of the general formula [1], the functional group is formyl (or aldehyde) or carboxy, respectively. When Q is alkyl or aryl, the functional group is alkyl ketone or aryl ketone, respectively. In such cases, alkyl has preferably 1–20 carbon atoms and specifically includes methyl, ethyl, propyl, butyl, pentyl, hexyl, isopropyl, tert-butyl, neopentyl, cyclopentyl, cyclohexyl and menthyl. Aryl has preferably 6–20 carbon atoms, and includes phenyl, tolyl, xylyl, naphthyl and anthryl. When Q is alkyloxy or aryloxy, the functional group is so-called ester, and is alkoxycarbonyl or aryloxycarbonyl, respectively. Alkoxy has preferably 1–20 carbon atoms and includes specifically methoxy, ethoxy, propoxy, butoxy, pentoxy, hexyloxy, isopropoxy, tert-butoxy, neopentoxy, cyclopentoxy, cyclohexyloxy and menthoxy. Aryloxy has preferably 6–20 carbon atoms and includes phenoxy, tolyloxy, xylyloxy, naphthyloxy and anthryloxy.

When Q is oxycarbonyl, the functional group is carboxylic acid anhydride. When Q is halogen, the functional group is haloformyl and halogen is selected from fluorine, chlorine, bromine and iodine. When Q is amino, aminocarbonyl, or hydrazino, the functional group is respectively amide(carbamoyl), imide and hydrazide. Hydrogen on these functional groups can be substituted with, for example, methyl, ethyl, propyl, butyl, isopropyl, tert-butyl, cyclopentyl, cyclohexyl or other alkyl groups or phenyl, tolyl or other aryl groups. When Q is oxyanion, the functional group is carboxyanion and cation pair includes ammonium, sodium, potassium, calcium, magnesium, zinc and tin.

The organic high molecular compound which contains the carbonyl-containing group represented by the formula [1] of the invention can be divided into the following three classes.

(I) An organic high molecular compound obtained by (co) polymerization of monomer which contains carbonyl-containing group.

(II) An organic high molecular compound obtained by graft or graft (co)polymerization of an unsaturated compound which contains the carbonyl-containing group on an organic high molecular compound having no functional group.

(III) An organic high molecular compound obtained by modification with the carbonyl-containing compound or with a precursor compound of the carbonyl-containing group.

The classification will be specifically shown below.

(I) The monomer which comprises the carbonyl-containing group and can be used for the preparation of the organic high molecular compound by way of (co)polymerization includes, for example, methacrylic acid, acrylic acid; methyl methacrylate, methyl acrylate and other acrylate esters; methacrylamide, acrylamide, crotonamide and other acrylamides; vinyl acetate, methyl vinyl ketone, acryloyl chloride, acrylaldehyde and other vinyls; β-propiolactone and other lactones; ε-caprolactam and other lactams; tetramethylene diisocyanate, hexamethylene diisocyanate, octamethylene diisocyanate and other isocyanates; β-benzylaspartic anhydride, 4-benzyloxazolido-2,5-dion and other N-carboxyamino acid anhydrides; ε-aminocaproic acid, ω-aminoundecanoic acid and other aminocarboxylic acids; maleic anhydride, itaconic anhydride, phthalic anhydride, pyromellitic anhydride, and other carboxylic acid anhydrides; hexamethylenediamine, nonamethylenediamine, phenylenediamine and other amines; adipic acid, maleic acid, itaconic acid and other dicarboxylic acids; adipic dichloride, phthalic dichloride and other haloformyls; dimethyl terephthalate and other esters; and ethylene glycol, propylene glycol, butanediol, hexamethylene glycol, bisphenol A and other alcohols. These monomers can be used singly or as a mixture and can also be used in combination with other monomers which are free from carbonyl-containing monomer, for example, α-olefins, styrenes, epoxy compound and ethers.

The organic high molecular compound containing carbonyl group can be prepared by radical polymerization, cation polymerization, anion polymerization, transition metal catalyst polymerization, ring opening polymerization, polyaddition polymerization and polycondensation. No particular restriction is imposed upon the polymerization process.

Further, as to the organic high molecular compound obtained by grafting or graft polymerization of an unsaturated compound containing the carbonyl-containing group on the organic high molecular compound (II) which has no functional group, the organic high molecular compound having no functional group includes, for example, polyethylene, polypropylene, ethylene propylene copolymer, polybutene, ethylene butene copolymer, ethylene propylene-butene copolymer, polyisobutylene, polypentene, poly-4-methylpentene, polynorbornene, polybutadiene, polyisoprene, polystyrene, poly-α-methylstyrene, polyethylene oxide, polypropylene oxide, polytetrahydrofuran, polysiloxane and other high molecular compounds. These compounds are preferably polyethylene, polypropylene, ethylene-propylene copolymer, polybutene, ethylene butene copolymer, ethylene propylene butene copolymer, polyisobutene, polypentene, poly-4-methylpentene, polynorbornene, polybutadiene, polyisoprene, polystyrene and poly-α-methyl styrene. The unsaturated compound comprising the carbonyl-containing group includes, for example, methacrylic acid, acrylic acid, and other acrylic acids; methyl methacrylate, 3-methacryloxypropyl-trimethoxysilane, methyl acrylate and other acrylate esters; methacrylamide, acrylamide, crotonamide and other acrylamides; vinyl acetate, methyl vinyl ketone, acryloyl chloride, acrylaldehyde and other vinyl compounds; maleic anhydride, itaconic anhydride and other carboxylic acid anhydrides; maleic acid, itaconic acid and other dicarboxylic acids.

The organic high molecular compound (III) which is obtained by modifying with a compound containing a carbonyl-containing group or a precursor compound of carbonyl group includes, for example, a compound obtained by partly modifying or denaturing an organic high molecular compound such as polyvinyl alcohol, polyvinyl chloride, polyvinyl pyridine, nitrated polystyrene, polyacrylonitrile and cellulose by, for example, esterification, oxidation, reduction and acrylating reaction, and also includes a high molecular compound obtained by partially modifying or denaturing polystyrene or poly-α-methylstyrene through a Friedel-Crafts reaction with acetyl chloride, adipic acid dichloride, phthalic dichloride and other haloformyls, and acetic anhydride.

No particular restriction is imposed upon the preparation process of the organic high molecular compound containing the carbonyl-containing group represented by the above general formula (1). Reaction in an organic or aqueous medium, gas phase reaction, gas/solid reaction, solventless bulk reaction, melt-kneading reaction and other any type of reaction can be applied to the preparation of the organic high molecular compound. The content of the functional group in said organic high molecular compound is $1\times10^{-6}$–$1\times10^{-2}$ mol, preferably $1\times10^{-5}$–$1\times10^{-3}$ mol per 1 g of said organic high molecular compound.

The support which is insoluble in the inert organic solvent in the invention is preferably an organic polymer in the above classification of the organic high molecular compound, more preferably the organic polymer obtained by grafting or graft-polymerizing on polypropylene an unsaturated compound containing the carbonyl-containing group.

The support is more specifically an organic high molecular compound obtained by grafting maleic anhydride, itaconic anhydride, methacrylic acid, acrylic acid, methyl methacrylate, 3-metharyloxypropyltrimethoxysilane or methyl acrylate, on polyethylene, polypropylene, polybutene, polyisobutene, polypentene, poly-4-methylpentene, polynorbornene, polybutadiene, polyisoprene, polystyrene, poly-α-methylstyrene and other polyolefins. The support also includes an organic polymer obtained, after such grafting or graft-polymerizing, by at least partially modifying or denaturing the functional group which is already grafted on the organic high molecular compound by reactions such as esterification, amidation, haloformylation and acylation.

The preferably exemplified support which is insoluble in the inert organic solvent in the invention supports the organic aluminum oxy compound on the organic polymer by bring the organic aluminum oxy compound into contact with the organic polymer containing the above carbonyl-containing group. The organic aluminum oxy compound is maintained on the support by chemical bond with the organic polymer. Consequently, concerning the configuration of the catalyst system comprising of the organic transition material compound which is soluble in the inert organic solvent and the support which is insoluble in the inert organic solvent, it is assumed that the organic transition metal compound is maintained by way of the organic aluminum oxy compound which is supported on the organic polymer containing carbonyl-containing group, and the transition metal compound is not maintained directly on the organic polymer by chemical bonding with carbonyl group of the organic polymer or by impregnation with the organic polymer.

The organic aluminum oxy compound which can be used in the invention is conventionally known aluminoxane represented by the general formula [4]:

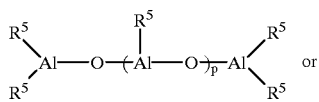

the general formula [5]:

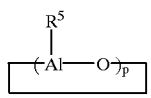

wherein $R^5$ can be the same or different and is an alkyl of 1–6 carbon atoms, aryl of 6–18 carbon atoms, or hydrogen, p is an integer of 2–50, preferably 10–35.

An organic aluminum compound can be mixed with the above organic aluminum oxy compound.

In the invention, the process for bringing the organic aluminum oxy compound into contact with the organic high molecular compound containing the carbonyl-having group and being a support insoluble in the inert organic solvent, includes the below described processes.

(A) A process for bring the organic aluminum oxy compound into contact with an organic high molecular compound containing the carbonyl-containing group which is dissolved in a hot, inert organic solvent (B) A process for bring the organic aluminum oxy compound into contact with an organic high molecular compound containing the carbonyl-containing group which is suspended in an inert organic solvent.

(C) A process for bring the organic aluminum oxy compound into contact with a powdery organic high molecular compound containing the carbonyl-containing group.

The inert organic solvents used in the processes (A) and (B) are alkane, aromatic hydrocarbon, ether or halogenated hydrocarbon, preferably alkane of 1–20 carbon atoms, aromatic hydrocarbon of 6–20 carbon atoms, ether of 2–20 carbon atoms, and halogenated hydrocarbon of 1–20 carbon atoms. More specifically, these solvents include pentene, heptane, octane, isobutene, neopentane, cyclopentane, decaline and other alkanes; benzene, toluene, xylene and other aromatic hydrocarbons; diethyl ether, tetrahydrofuran, 1,2-dimethoxyethane, dioxane and other ethers; and dichloromethane, chloroform and other halogenated hydrocarbon. The inert organic solvents can be a mixture of the same.

In the process (A), the organic high molecular compound containing the carbonyl-containing group and being insoluble at room temperature in the inert organic solvent, is dissolved in the inert organic solvent by heating to the contact temperature range of 40–250° C., preferably 60–200° C. The solution thus obtained is brought into contact with the organic aluminum oxy compound for 10 minutes to 24 hours. A powdered organic high molecular compound which supports the organic aluminum oxy compound can be obtained from the above solution after contact treatment by, for example, the process shown below.

1 Solid component precipitates by cooling.

2 Solid component precipitates by adding a poor solvent to the solution.

3 Solution is sprayed from a nozzle to the poor solvent to precipitate the solid component.

4 The solution is sprayed with a spray drier into a solvent evaporating atmosphere to obtain powdery product.

5 Solvent is removed from the solution and the dried residue is ground by a vibration mill or ball mill.

Operation temperature of 1–5 is lower than the melting point of the organic high molecular compound.

In the process (B), said organic high molecular compound is suspended in the inert organic solvent and is contacted with the organic aluminum oxy compound at the contact temperature range of –80–200° C., preferably –20–150° C., for 10 minutes to 24 hours. A poor solvent is added to the suspension after contact treatment to precipitate the solid component. Alternatively, the solvent is removed from the suspension and the residue is ground by a vibration mill or ball mill.

The process (C) is most simple. The organic high molecular compound containing the carbonyl-containing group is ground into powder substantially in the absence of solvent with a mixer or mill. In the operation, the organic aluminum oxy compound is added and brought into contact with the powdery organic high molecular compound in a contact temperature range of –80° C.–200° C., preferably –20° C.–150° C. for a contact time of 30 minutes to 24 hours. The obtained powder can also be suspended in a poor solvent.

In the above processes (A)–(C), the proportion of the organic high molecular compound containing the carbonyl-containing group to the organic aluminum oxy compound is $1\times10^{-5}$–0.1 mol, preferably $1\times10^{-4}$–0.01 mol of aluminum in the organic aluminum oxy compound for 1 g of said organic high molecular compound.

In the present invention, the organic high molecular compound which is obtained in the above processes (A)–(C), supporting the organic aluminum oxy compound, and containing the carbonyl-containing group is preferably washed with the inert organic solvent to remove unsupported organic aluminum oxy compound in view of preventing adhesion of the organic aluminum oxy compound on the inner wall of the reactor. The washing method is to suspend in the inert organic solvent the organic high molecular compound which supports the organic aluminum oxy compound, or after rinsing the inert organic solvent to said organic high molecular compound, washed product is obtained by filtration, decantation or centrifugation. The inert organic solvent preferably dissolves unsupported organic aluminum oxy compound and cannot dissolve the organic high molecular compound which supports the organic aluminum oxy compound. No particular limitation is imposed upon the amount of washing solvent and washing cycle. Washing temperature is lower than the melting point of the organic high molecular compound.

In the process for polymerizing an olefin by using the catalyst system comprising the organic transition metal compound which is soluble in the inert organic solvent of the invention and the support which is insoluble in the inert organic solvent, the proportion of the organic high molecular compound which supports the organic aluminum oxy compound to the organic transition metal compound is 1–10000, preferably 10–2000 in the mol ratio of aluminum/transition metal.

The invention can polymerize an olefin by using the catalyst system comprising the organic transition metal catalyst and the support which supports the organic aluminum oxy compound. When an organic metal compound is used in combination, preferable results are expected.

The organic metal compounds which can be used in combination in the polymerization of olefin comprise metals selected from groups 1, 2, 12, and 13 in the periodic table. Specifically, the organic metal compound consists of lithium, sodium, potassium, beryllium, magnesium, zinc, cadmium, aluminum, gallium and alkyl of 1–20 carbon atoms. Particularly preferred is an alkylaluminum compound having 1–20 carbon atoms. Specific examples of alkylaluminum compound include trimethylaluminum, triethylaluminum, tri-n-propylaluminum, triisopropylaluminum, tri-n-butylaluminum, triisobutylaluminum, tri-sec-butylaluminum, dimethylaluminum chloride, diethylaluminum chloride, di-n-propylaluminum, chloride, diisopropylaluminum chloride, di-n-butylaluminum chloride, diisobutylaluminum chloride, and di-sec-butylaluminum chloride. Particularly preferred compounds are trimethylaluminum, triethylaluminum, tri-n-butylaluminum, triisobutylaluminum, and tri-sec-butylaluminum.

The proportion of the organic metal compound to the organic transition metal compound which is soluble in the inert organic solvent is 1–10000, preferably 10–1000 in the mol ratio of the organic metal compound/ organic transition metal compound.

The proportion of the organic metal compound to the organic aluminum oxy compound supported on the organic high molecular compound is 0.01–100, preferably 0.1–10 in the mol ratio of aluminum in the organic high molecular compound/organic metal compound.

The invention can use an inert organic solvent for the preparation of an olefin polymerization catalyst system, when necessary. The inert organic solvent which can be preferably used are propane, butane, pentane, hexane, heptane, octane, nonane, decane, cyclopentane, cyclohexane and other alkanes; and benzene, toluene, xylene and other aromatic hydrocarbons; and a mixture of these solvents. The catalyst preparation temperature from the organic transition metal catalyst and the organic high molecular compound which supports organic aluminum oxy compound is −80° C.–250° C., preferably −20° C.–200° C., and the catalyst preparation time is 10 minutes to 3 days, preferably 20 minutes to 24 hours.

The catalyst system of the invention which comprises the organic transition metal compound and support can be used after previously subjecting to polymerization or copolymerization a small amount of an olefin. The procedure can provide the effect of improving the bulk density of the generated polymer. The amount of previously polymerized or copolymerized olefin is 0.1–300 g, preferably 0.5–100 g per 1 g of the solid catalyst. The preparation method of the solid catalyst by previously polymerizing a small amount of an olefin, can be applied to a slurry polymerization process which polymerizes olefin in an inert hydrocarbon, bulk polymerization process which polymerizes an olefin in a liquefied monomer, or gas phase polymerization process which polymerizes in a gaseous olefin monomer.

Polymerization temperature is usually −100–200° C., preferably −20–100° C. No particular limitation is imposed upon the reaction pressure. The polymerization can be supported out batch wise, semibatch wise, and continuously.

Olefins which can be polymerized by the catalyst system of the invention are α-olefins (including ethylene) having 2–20 carbon atoms, preferably 2–10 carbon atoms, and specifically include ethylene, propylene, 1-butene, 3-methyl-1-butene, 1-pentene, 4-methyl-1-pentene, 1-hexene, vinylcyclohexane and styrene. Olefins further include butadiene, 1,4-pentadiene, 1,5-hexadiene, 1,4-hexadiene and other dienes having 4–20 carbon atoms; dicyclopentadiene, norbornene, methylnorbornene, tetracyclododecene and other cyclic olefins; and allyltrimethylsilane, vinyltrimethylsilane and other silicone containing olefins. These olefins can be used singly or as a mixture.

In the invention, an olefin polymerization can be supported out by slurry polymerization, bulk polymerization and gas phase polymerization. The catalyst system of the invention can also be used for solution polymerization.

Polymerization temperature is usually −100–200° C., preferably −20–100° C.

Polymerization pressure is atmospheric pressure −80 kgf/cm$^2$. Molecular weight of an olefin polymer can be controlled by using hydrogen and other molecular weight regulators.

EXAMPLES

The invention will be hereinafter illustrated further in detail by way of examples. However, these examples are not to be construed to limit the scope of the invention.

In the invention, melting point (Tm), molecular weight distribution index (PDI), inherent viscosity ([η]), and fish eye or Gel(FE) were measured by the following methods.
Melting point (Tm):

Melting point was measured with a differential scanning calorimeter (DSC) under following conditions.

Apparatus: Perkin-Elmer DSC-4

Temperature rise rate: 10° C./min.

Temperature falling rate: −10° C./min. or −30° C./min.
Molecular weight distribution index (PDI=Mw/Mn):

Number average molecular weight (Mn) and weight average molecular weight (Mw) were measured by gel permeation chromatography under following conditions.

Apparatus: Waters 150 cv plus

Column: Shodex GPC AD-80 M/S
  (exclusion limit: 2×10$^7$)

Eluent: 1,3,5-trichlorobenzene

Column temperature: 135° C.

Flow rate at measurement: 1.0 ml/min

Sample concentration: 0.2 wt/vol %

Injector volume: 0.200 ml

Detector: differential refractometer and viscometer

Reference sample: polystyrene standard
Inherent viscosity ([η]):

Viscosity was measured at 135° C. in tetralin solvent and shown in dl/g unit.
Fish eye or Gel(FE):

To 100 parts by weight of polypropylene powder obtained by polymerization, 0.3 part by weight of 3,5-di-t-butyl-4-hydroxytoluene was added and mixed. The mixture was pelletized at 250° C. The pellet was successively melt-extruded with a 20 mmφ extruder at a resin temperature of 250° C. and delivered through a down-flow T-die to obtain a film having a thickness of 40 μm. Numbers of fish-eye having a size of 100 μm or more and less than 100 μm were counted for each area of 600 cm$^2$ on the film.

Example 1
[Preparation of organic aluminum oxy compound supported on high molecular compound (A)]

In 200 ml four necked flask sufficiently replaced with nitrogen, 5 g of maleic anhydride grafted polypropylene (maleic anhydride content: 10 wt %, 1 mmol/g), which was obtained according to the process of Japanese published patent SHO 59-14488, was suspended in 45 ml of toluene. To the suspension, 38 ml of a toluene solution which contains 2.7 g of methylaluminoxane (manufactured by Albemarle Co. methylaluminoxane content of 8 wt %) was added and then heated with stirring at 80° C. for 6 hours. The reaction mixture was cooled to room temperature, and allowed to stand. Pale yellow solid was precipitated. Supernatant was separated by decantation, 50 ml of toluene was added, and the mixture was heated at 70° C. for 30 minutes, and allowed to stand at room temperature. These procedures were repeated three times. After removed of supernatant and dried in vacuo, 5.2 g was obtained as pale yellow solid catalyst component(A). The solid component had 3 mmol/g as aluminum content.

[Polymerization of propylene]

In 50 ml two necked flask sufficiently replaced with nitrogen, 480 mg of the above-obtained pale-yellow solid catalyst component (A) was suspended in 20 ml of heptane. 1.0 mg of diphenylmethylene-(cyclopentadienyl) fluorenylzirconium dichloride which was prepared according to the process of Japan laid-Open HEI 2-274703 and 0.128 g of triisobutylaluminum were successively added to the suspension for the preparation of the catalyst.

Into 5 liter stainless steel autoclave sufficiently replaced with nitrogen, successively with propylene, the above prepared catalyst was introduced. Then 1.5 kg of propylene and 2N liters of hydrogen were introduced and heated. Polymerization was carried out at 60° C. for 1 hour. No adhesion or fouling of the polymer in the polymerization was observed at all on the inner wall, stirrer blade and shaft of the autoclave. Polymer yield was 4.30 g. The obtained polymer had inherent viscosity [η] of 1.42 dl/g, PDI of 2.4, Tm of 133° C., bulk density of 0.36 g/ml. The number of FE (fish eye or Gel) were 3 FE as 100 μm or more, and 10 FE as less than 100 μm.

Example 2

[Preparation of organic aluminum oxy compound supported on high molecular compound (B)]

In 1 liter four necked flask sufficiently replaced with nitrogen, 20 g of maleic anhydride grafted polypropylene (Mw: 43500, maleic anhydride content of 6.7 wt %) was suspended in 200 ml of toluene. To the suspension, 135 ml of a toluene solution of methylaluminoxane (manufactured by Albemarle Co. methylaluminoxane content of 8 wt %) was added under nitrogen, heated with stirring at 80° C. for 6 hours and then cooled to 40° C. The solvent was evaporated in vacuo. To the obtained yellow-solid, 300 ml of hexane was added, washed with stirring and allowed to stand. 220 ml of supernatant was separated by inverse filtration. The residue was further washed with 400 ml of toluene and 350 ml of the solvent was removed by inverse filtration. These procedures were repeated three times and then all solvents were removed in vacuo to give 24.8 g as pale yellow solid catalyst. The solid catalyst component (B) was prepared by grinding the pale yellow solid in a ball mill.

The solid component had 3.6 mmol/g as aluminum content.

[Polymerization of propylene]

Polymerization of propylene was carried out according to procedures described in Example 1, but using 240 mg of the above pale yellow solid catalyst component (B) and 3N liter of hydrogen instead of 480 mg of solid catalyst component (A) and 2N liter of hydrogen. No adhesion or fouling of the polymer was observed at all on the inner wall, stirrer blade, and shaft of the autoclave. Polymer yield was 490 g. The obtained polymer had inherent viscosity [η] of 1.22 dl/g, PD1 of 2.4, Tm of 133° C., and bulk density of 0.36 g/ml. The number of FE were 8 fisheyes as 100 μm or more and 30 fisheyes less than 100 μm.

Example 3

[Preparation of organic aluminum oxy compound supported on high molecular compound (C)]

In 500 ml four necked flask which was sufficiently replaced with nitrogen, 1 g of maleic anhydride grafted polypropylene (maleic anhydride content: 10 wt %, 1 mmol/g) was suspended in 400 ml of xylene. The suspension was heated at reflux until the grafted polypropylene was completely dissolved. To the boiling solution, 10 ml of a toluene solution containing 0.68 g of methylaluminoxane (manufactured by Albemarle Co., methylaluminoxane content of 8 wt. %) added dropwise via a dropping funnel and refluxed for 4 hours. The reaction mixture was gradually cooled to room temperature over 12 hours and allowed to stand in order to precipitate pale yellow solid component. The supernatant was removed by decantation, 100 ml of toluene was added and stirred at 20° C. for 30 minutes and then the mixture was allowed to stand. These washing procedures were repeated three times, the supernatant was removed and the suspension containing the solid component (C) was obtained.

The solid component concentration in this suspension was 0.31 g/ml. Aluminum content was 6 mmol/g as measured this solid component which was dried in vacuo from a certain amount of suspension.

[Polymerization of propylene]

In 100 ml two necked flask which was sufficiently replaced with nitrogen in advance, 0.77 ml of the above suspension, 20 ml of heptane, 1.0 mg of diphenylmethylene (cyclopentadienyl)fluorenylzirconium dichloride, and 0.128 g of triisobutylaluminium were added for catalyst preparation. Into 5 liter stainless steel autoclave which was replaced with a nitrogen well and then with propylene, the above catalyst was introduced, 1.5 kg of propylene and 3N liter of hydrogen were introduced.

The mixture was heated at 60° C. and polymerization was carried out for 1 hour while maintaining the temperature. No adhesion or fouling of the polymer in the polymerization was observed at all on the inner wall, stirring blade and shaft of the autoclave. Polymer yield was 490 g.

The obtained polymer had an inherent viscosity [η] of 1.22 dl/g, PDI of 2.4, Tm of 134° C. and bulk density of 0.36 g/m. The number of FE were 3 fisheyes as 100 μm or more and 10 fisheyes as less than 100 μm.

Example 4

[Preparation of organic aluminum oxy compound supported on high molecular compound (D)]

It was performed according to the procedure described in Example 3, but removing all solvent in vacuo from the suspension after removed of the supernatant to give 1.2 g as pale yellow solid component having 6 mmol/g as aluminum content.

[Polymerization of propylene]

It was performed according to the procedures described in Example 3, but using 240 mg of the pale yellow solid catalyst component (D) instead of the suspension containing the solid component[C].

No adhesion or fouling of the polymer in the polymerization was observed at all on the autoclave inner wall, stirring blade and shaft. The polymer yield was 489.9 g. The polymer obtained had an inherent viscosity [μ] of 1.12 dl/g, PDI of 2.4, Tm of 134° C. and bulk density of 0.36 g/ml. The number of FE were 3 fisheyes as 100 μm or more and 10 fisheyes as less than 100 μm.

Example 5

[Preparation of organic aluminum oxy compound supported on high molecular compound (E)]

In 3 liter four necked flask which was sufficiently replaced with nitrogen, 4.2 g of maleic anhydride grafted polypropylene (Mw: 43500, maleic anhydride content: 6.7 wt %, 0.68 mmol/g) was suspended in 1.7 liter of xylene. The suspension was heated at 145° C. and completely dissolved. 28 ml of a toluene solution of methylaluminoxane (manufactured by Albemarle Co., methylaluminoxane content of 8 wt %) was added dropwise to the solution by using a dropping funnel under nitrogen, at reflux for 4 hours, and cooled to 40° C. To the reaction mixture, 200 ml of hexane was added and stirred for 30 minutes. After allowing to stand the resultant mixture, 1.6 liter of the supernatant was removed by inverse filtration. After adding 400 ml of toluene, the resulting suspension was stirred for 30 minutes, allowed to stand, and 400 ml of supernatant was removed by inverse filtration. The toluene washing procedures were repeated 3 times. 6.0 g of a pale yellow solid was obtained by drying in vacuo. The solid catalyst component (E) was prepared by further grinding the solid product with a vibration mill. The solid component had an aluminum content of 4.7 mmol/g.

[Polymerization of propylene]

It was performed according to the procedure described in Example 3, but using 240 mg of the above pale yellow solid component(E) instead of the solid catalyst component(B). No adhesion or fouling of the polymer was observed all on the inner wall, stirrer blade and shaft of the autoclave. Polymer yield was 620 g.

The polymer obtained had an inherent viscosity [η] of 1.29 dl/g, PD1 of 2.1, Tm of 134° C., and bulk density of 0.31 g/ml. The number of FE were 12 fisheyes as 100 μm or more and 30 fisheyes as less than 100 μm pieces.

Example 6

[Preparation of (1R,2R)-1,2-dimethylethylidiyl-1,2-bis(2'-methylbenz[e]indenyl)zirconium dichloride]

Trifluoromethanesulfonic anhydride (18.80 g) was added to a mixture of (2R,3R)-2,3-butanediol (ee=99.0%) (3.00 g) and a solution of pyridine (5.25) g in dichloromethane (100 ml)in ice bath and then stirred for 1 hour. Water was added to the reaction mixture, the organic layer was separated and dried over anhydrous magnesium sulfate. The product was passed through a silica gel column with hexane, concentrated and distilled to give (2R,3R)-2,3-butyldi(trifurate) as colorless liquid (5.31 g, 43° C./3 mmHg). Then to a solution of (2-methylbenz[e]indenyl)lithium (1.2 g) in tetrahydrofuran (hereinafter simply referred to THF) (50 ml) under nitrogen, a THF solution (10 ml) of (2R,3R)-2,3-butyldi (trifurate) (3.46 g) was added dropwise at −78° C., stirred at room temperature overnight and a saturated aqueous solution of ammonium chloride was added. The organic layer was separated, dried over anhydrous magnesium sulfate and evaporated to give orange oil. This oil was passed through a silica gel column with a mixture of hexane/ethyl acetate and all solvents were removed to give an yellow solid. The solid was recrystallized from benzene to give (2R,3R)-2,3-bis(2-methylbenz[e]indenyl)butane (0.50 g) as colorless crystal.

Further, a solution of the colorless crystal (310 mg) in THF (20 ml) was added dropwise at 0° C. to a suspension of the excess amount of potassium hydride (95 mg) in THF (30 ml), stirred at room temperature overnight and filtrated through celite. The filtrate was added dropwise at room temperature to a suspension of zirconium tetrachloride (280 mg, 0.74 mmol) in THF (30 ml) and stirred at room temperature overnight. After removing the solvent, the residual yellow solid was extracted by Soxhlet extraction with toluene. The toluene solution was concentrated to give yellow solid (200 mg).

Analytical data are listed below.

$^1$H-NMR (90 MHz, CDCl$_3$, TMS standard) δ; 7.67–7.86 (m, 4H), 7.35–7.58 (m, 6H), 7.00–7.29 (m, 4H), 3.48 (g, 2H), 1.26 (s, 6H), 1.24 (d, 6H).

Elemental analyses; Calculated C, 66.88; H, 4.93. Found C, 66.97; H, 4.98.

[Polymerization of propylene]

Into 50 ml two necked flask which was sufficiently replaced with nitrogen in advance, 480 mg of the solid catalyst component (A) which was prepared in Example 1 and 20 ml of heptane were introduced and added 1.0 mg of the above obtained (1R,2R)-1,2-dimethylethylidiyl-1,2-bis (2-methylbenz[e]indenyl)zirconium dichloride and 0.128 g of triisobutylaluminum for catalyst preparation.

Into 5 l stainless steel autoclave which was sufficiently replaced with nitrogen and successively with propylene, the above prepared catalyst was introduced and 1.5 kg of propylene was introduced. The mixture was heated and polymerization was carried out at 50° C. for 1 hour. No adhesion or fouling of the polymer in the polymerization was observed at all on the inner wall, stirring blade and shaft of the autoclave. Polymer yield was 600 g. The polymer obtained had an inherent viscosity [η] of 1.58 gl/g, PD1 of 2.6, Tm of 148° C., and bulk density of 0.38 g/ml. The number of FE were 3 fisheyes as 100 μm or more and 10 fisheyes less than 100 μm.

Example 7

Polymerization was performed according to the procedures described in Example 6, but using 360 mg of the solid catalyst component (E) prepared in Example 5, and polymerizing at 60° C.

No adhesion or fouling of the polymer in the polymerization was observed all on the inner wall, stirring blade and shaft of the autoclave. Polymer yield was 680 g. The obtained polymer had an inherent viscosity [η] of 1.50 dl/g, PDI of 2.3, μm of 149° C., and bulk density of 0.34 g/ml. The number of FE were 16 fisheyes as 100 μm or more and 40 fisheyes as less than 100 μm.

Example 8

[Catalyst component prepared by previous polymerization with a small amount of propylene]

In 50 ml two necked flask which was sufficient- ly replaced with nitrogen, 1 g of pale yellow solid catalyst component (A) prepared in Example 1 and 60 ml of heptane were suspended and then added successively 3.0 mg of diphenylmethylene(cyclopentadienyl)fluorenylzirconium dichloride used in Example 1 for catalyst preparation. Propylene was introduced into the catalyst via feed tube at 25° C. for 30 minutes under ambient pressure to prepare the catalyst with 2 g of polypropylene.

[Polymerization of propylene]

Into 5 liter stainless steel autoclave which was sufficiently replaced with nitrogen and successively with propylene, 0.128 g of triisobutylaluminum diluted in 20 ml of heptane was introduced and then 20 ml of the above catalyst slurry which was prepared by prepolymerizing propylene was introduced. Successively, 1.5 kg of propylene and 2N liter of hydrogen were introduced and then polymerized at 60° C. for 1 hour. No adhesion or fouling of the polymer in the polymerization was observed at all on the inner wall, stirring blade or shaft of the autoclave. Polymer yield was 400 g. The obtained polymer had an inherent viscosity [η] of 1.40 dl/g, PDI of 2.4, Tm of 134° C. and bulk density of 0.36 g/ml.

The number of FE were 3 fisheyes as 100 μm or more and 10 fisheyes as less than 100 μm.

Comparative Example 1

[Preparation of catalyst component consisting of maleic anhydride and organic aluminum oxy compound]

In 300 ml four necked flask which was sufficiently replaced with nitrogen, 0.37 g (3.7 mmol) of maleic anhydride was added to 30 ml of toluene, successively, 28 ml of a toluene solution containing 2.0 g of methylaluminoxane (manufactured by Albemarle Co., methylaluminoxane content of 8 wt. %) was added, heated with stirring at 80° C. for 6 hours, and cooled to room temperature. The obtained yellow reaction mixture had no solid precipitate. However, the mixture was divided into two layers, that is, a dark yellow layer and pale yellow layer, though the interface was obscure. The pale yellow upper layer was separated, 60 ml of toluene was added, stirred for 30 minute at room temperature and allowed to stand. Such washing procedures were repeated four times. The upper layer was removed, the residue was dried in vacuo to give 1.7 g as white solid catalyst component. The solid component had 16 mmol/g as aluminum component.

[Polymerization of propylene]

In 50 ml two necked flask which was sufficiently replaced with nitrogen, 240 mg of the above white solid catalyst component was suspended in 20 ml of heptane. The catalyst was prepared by successively adding 1.0 mg of diphenylmethylene(cyclopentadienyl)fluorenylzirconium dichloride which was used in Example 1 and 0.128 g of triisobutylaluminum. This catalyst was introduced into 5 liter stainless steel autoclave which was sufficiently replaced with nitrogen and then with propylene. Polymerization was performed according to the procedures described in Example 1. The terrible adhesion or fouling of the polymer in the polymerization was observed on the inner wall, stirrer blade and shaft. Polymer yield was 155 g. The polymer had an inherent viscosity [η] of 1.29 dl/g, PDI of 2.4, Tm of 130° C. and bulk density of 0.20 g/ml.

Comparative Example 2

[Preparation of catalyst component consisting of maleic anhydride and organic aluminum oxy compound]

In 300 ml four necked flask which was sufficiently replaced with nitrogen, 0.55 g (5.5 mmol) of maleic anhydride was added to 30 ml of toluene and 2.8 ml of a toluene solution containing 2.0 g of methylaluminoxane (manufactured by Albemarle Co., methylaluminoxane content of 8 wt. %) was added. The mixture was heated with stirring at 80° C. for 8 hours, cooled to room temperature and allowed to stand. The pale yellow solid was precipitated. The supernatant were removed by decantation, and 50 ml of toluene was added, heated at 70° C. for 30 minutes, and allowed to stand. Such washing procedures were repeated 3 times. After removal of the supernatant, the solid was dried in vacuo to give 2.1 g of pale yellow solid catalyst component. The solid component had 17 mmol/g as aluminum content.

[Polymerization of propylene]

In 50 ml two necked flask which was sufficient- ly replaced with nitrogen, 480 mg of the above pale yellow solid component was suspended in 20 ml of heptane. The catalyst was prepared by successively adding 1.0 mg of diphenylmethylene(cyclopentadienyl)fluorenylzirconium dichloride used in Example 1 and 0.128 g of triisobutylaluminum. Into 5 liter stainless steel autoclave which was replaced with nitrogen and then with propylene, the above prepared catalyst was introduced and 1.5 kg of propylene and 3.3 N liter of hydrogen were introduced. The temperature was elevated and polymerization was carried out at 60° C. for 1 hour.

The terrible adhesion or fouling of the polymer in the polymerization was observed on the inner wall, stirrer blade, and shaft of the autoclave. Polymer yield was 10 g. The polymer obtained had an inherent viscosity [η] of 0.89 dl/g, PDI of 3.2, Tm of 126° C. and bulk density of 0.26 g/m.

Comparative Example 3

[Preparation of catalyst component consisting of organic aluminum oxy compound and silica]

According to the procedure described in example concerning catalyst A (in catalyst preparation) in Japan Laid-Open SHO 61-296008, 5 g of silica : SILDEX H-121 (manufactured by Asahi glass Co.) was suspended in 25 ml of toluene. Silica was treated with aluminoxane by adding 45 ml of toluene solution of methylaluminoxane which was used in Example 1 to give 7.4 g as solid catalyst component. The solid component had 6 mmol/g as aluminum content.

[Polymerization of propylene]

In 50 ml two necked flask which was sufficient- ly replaced with nitrogen, 60 mg of the above solid catalyst component was suspended in 20 ml of heptane. The catalyst was prepared by successively adding 1.0 mg of diphenylmethylene(cyclopentadienyl)fluoroenylzirconium dichloride used in Example 1 and 0.128 g of triisobutylaluminum. Into 5 liter stainless steel autoclave which was sufficiently replaced with nitrogen and then with propylene, the above prepared catalyst was introduced and polymerization was carried out by the procedures de- scribed in Comparative Example 2. No adhesion or fouling of the polymer in the polymerization was observed at all on the inner wall, stirrer blade and shaft of the autoclave. Polymer yield was 500 g. The obtained polymer had an inherent viscosity [η] of 1.38 dl/g, PDI of 2.6, Tm of 130° C., and bulk density of 0.37 g/ml.

The number of FE (fish eye) were 100 fisheyes as 100 μm or more and 6000 fisheyes as less than 100 μm.

Comparative Example 4

In 50 ml two necked flask which was sufficiently replaced with nitrogen, to 23.8 ml of a toluene solution which contains 1.7 g of methylaluminoxane (manufactured by Albemarle, methylaluminoxane content of 8 wt %) in 10 ml of toluene was added. 2.0 mg of diphenylmethylene (cyclopentadienyl)fluorenylzirconium dichloride to prepare the catalyst. Into 5 liter stainless steel autoclave which was sufficiently replaced with nitrogen and then with propylene, the above prepared catalyst was introduced, 1.5 kg of propylene and 3N liter of hydrogen were introduced, temperature was elevated to 60° C., and polymerization was carried out for 1 hour at 60° C. The terrible adhesion or fouling of the polymer in the polymerization was observed on the inner wall, stirring blade and shaft of the autoclave. Polymer yield was 495 g. The obtained polymer had an inherent viscosity [η] of 1.67 d./g, PDI of 2.1, Tm of 140° C., Tm of 140° C. and bulk density of 0.20 g/ml. The number of FE (fish eye) were 7 fisheyes as 100 μm or more and 14 fisheyes less than 100 μm.

Comparative Example 5

In 50 ml two necked flask which was sufficiently replaced with nitrogen, 100 mg of solid catalyst component prepared in Comparative Example 3 was suspended in 20 ml of heptane. The catalyst was prepared by successively adding 1.0 mg of(1R,2R)-1,2-dimethylethylidiyl-1,2-bis(2'-methylbenz[e]indenyl)zirconium dichloride used in Example 6 and 0.16 g of triisobutylaluminum. Into 5 liter stainless steel autoclave which was sufficiently replaced with nitrogen and then with propylene, the above prepared catalyst was introduced and polymerization was carried out by the procedures described in Comparative Example 3. No adhesion or fouling of the polymer in the polymerization was observed all on the inner wall, stirring blade or shaft of the autoclave. Polymer yield was 467 g. The polymer obtained had an inherent viscosity [η] of 1.67 dl/g, PDI of 2.5, Tm of 142° C. and bulk density of 0.38 g/ml. The number of FE were 300 fisheyes as 100 μm or more and 9000 fisheyes as less than 100 μm.

Example 9

[Synthesis of isopropylidene cyclopentadienyl (2,7-di-tert-butylfluorenyl)zirconium dichloride]

The entitled compound was prepared according to Japanese Laid-Open HEI 5-125112.

Analytical data are listed below.

$^1$H-NMR (90 MHz, $C_6D_6$, TMS standard) δ; 7.93–7.50 (m, 6H), 6.16 (dd, 2H), 5.58 (dd, 2H), 2.08 (s, 6H), 1.34 (s, 18H)

| Elemental Analysis | C | H |
|---|---|---|
| Calculated | 63.94 | 6.20 |
| Found | 64.07 | 6.68 |

[Polymerization of propylene]

It was performed according to the procedure described in Example 5, but using 2.0 mg of isopropylidenecyclopentadieny(2,7-di-tert-butylfluorenyl)zirconium dichloride instead of 1.0 mg of diphenylmethylene (cyclopentadienyl)fluorenylzirconium dichloride. No adhesion or fouling of the polymer in the polymerization was observed at all on the inner wall, stirrer blade and shaft of the autoclave.

The polymer yield was 397 g. The obtained polymer had an inherent viscosity [η] of 0.70 dl/g, PDI of 2.3, Tm of 137° C., and bulk density of 0.35 g/ml. The number of FE were 8 fisheyes as 100 μm or more and 40 fisheyes less than 100 μm.

Example 10

[Synthesis of ethylenebis(indenyl)zirconium dichloride]

The entitled compound was prepared according to the literature by Scott Collins et al in Journal of Organometallic Chemistry 342, 21 (1988). Analytical data are listed below.

$^1$H-NMR (90 MHz, $C_6D_6$, TMS Standard) δ; 7.33–6.70 (m, 8H), 6.41 (d, 2H), 5.73 (d, 2H), 3.05 (q, 4H)

[Polymerization of propylene]

It was performed according to the procedure described in Example 5, but using 2.0 mg of ethylenebis (indenyl) zirconium dichloride instead of 1.0 mg of diphenylmethylene(cyclopentadienyl)fluorenylzirconium dichloride. No adhesion or fouling of the polymer in the polymerization was observed at all on the inner wall, stirrer blade and shaft of the autoclave.

The polymer yield was 97 g. The obtained polymer had an inherent viscosity [η] of 0.40 dl/g, Tm of 133° C., and bulk density of 0.36 g/ml. The number of FE were 14 fisheyes as 100 μm or more and 50 fisheyes as less than 100 μm.

Comparative Example 6

In 50 ml two necked flask which was sufficiently substituted with nitrogen, 60 mg of the solid catalyst component prepared in Comparative Example 3 was suspended in 20 ml of heptane. Successively, propylene was polymerized by the procedures described in Comparative Example 3, but using 2.0 mg of isopropylidenecyclopentadienyl(2,7-di-tert-butylfluorenyl)zirconium dichloride instead of 1.0 mg of diphenylmethylene(cyclopentadienyl)fluorenylzirconium dichloride. No adhesion or fouling of the polymer the polymerization was observed at all on the inner wall, stirring blade and shaft of the autoclave. The polymer yield was 417 g. The obtained polymer had an inherent viscosity [η] of 0.93 dl/g, Tm of 132° C., and bulk density of 0.38 g/ml. The number of FE were 200 fisheyes as 100 μm or more and 9,000 fisheyes as less than 100 μm.

Comparative Example 7

Propylene was polymerized by the procedures described in Comparative Example 5, but using 2.0 mg of ethylenebis (indenyl)zirconium dichloride instead of 1.0 mg of (1R,2R)-1,2-dimethylethylidiyl-1,2-bis(2-methylbenz[e]indenyl) zirconium dichloride. No adhesion or fouling of the polymer in the polymerization was observed all on the inner wall, stirrer blade and shaft of the autoclave. The polymer yield was 105 g. The obtained polymer had an inherent viscosity [η] of 0.53 dl/g, Tm of 142° C. and bulk density of 0.35 g/ml. The number of FE were 150 fisheyes as 100 μm or more and 7,000 fisheyes as less than 100 μm.

Example 11

[Synthesis of rac-dimethylsilylbis(2-methylbenz[e]-indenyl) zirconium dichloride]

The entitled compound was prepared according to the literature by Udo Stehling et al., in organometallics 13,964 (1994).

Analytical data are listed below.

$^1$H-NMR (90 MHz, $CDCl_3$, TMS standard) δ; 8.00–7.15 (m, 14H), 2.37 (s, 6H), 1.34 (s, 6H)

[Polymerization of propylene]

Propylene was polymerized by the procedures described in Example 10, but using 3.0 mg of rac-dimethylsilylbis(2-methylbenz[e]indenyl)zirconium dichloride instead of ethylenebis(indenyl)zirconium dichloride. No adhesion or fouling of the polymer in the polymerization was observed at all on the inner wall, stirrer blade and shaft of the autoclave. The polymer yield was 649 g. The obtained polymer had an inherent viscosity [η] of 1.09 dl/g, Tm of 145° C. and bulk density of 0.36 g/ml. The number of FE were 4 fisheyes as 100 μm or more and 35 fisheyes as than 100 μm.

Example 12

[Synthesis of rac-dimethylsilyl(2,4-dimethylcyclopentadienyl)(3',5'-dimethylcyclopentanedienyl)zirconium dichloride]

The entitled compound was prepared according to the literature by Takaya Mise et al., in Chemistry Letters, 1853 (1989).

Analytical data are listed below.

$^1$-NMR (90 MHz, $CDCl_3$, TMS standard) δ: 6.43 (d, 2H), 5.27 (d, 2H), 2.28 (s, 6H), 2.05 (s, 6H), 0.77 (s, 6H),

[Polymerization of propylene]

Propylene was polymerized by the procedures described in Example 10, but using 2.0 mg of rac-dimethylsilyl(2,4-dimethylcyclopentadienyl((3',5'-dimethylcyclopentadienyl) zirconium dichloride instead of ethylenebis(indenyl) zirconium dichloride. No adhesion or fouling of the polymer in the polymerization was observed at all on the inner wall, stirrer blade and shaft of the autoclave. The polymer yield was 49 g. The obtained polymer had an inherent viscosity [η] of 0.77 dl/g, Tm of 153° C. and bulk density of 0.35 g/ml. The number of FE were 6 fisheyes as 100 μm or more and 20 fisheyes as less than 100 μm.

Comparative Example 8

Propylene was polymerized by the procedures described in Comparative Example 5, but using 3.0 mg of rac-dimethylsilylbis(2-methylbenz[e]indenyl)zirconium dichloride instead of 1.0 mg of (1R,2R)-1,2-dimethylethylidiylbis (2'-methylbenz[e]indenyl)zirconium dichloride. No adhesion or fouling of the polymer in the polymerization was observed at all on the inner wall, stirrer blade and shaft of the autoclave. The polymer yield was 589 g. The obtained polymer had an inherent viscosity [η] of 1.26 dl/g, Tm of 145° C. and bulk density of 0.35 g/ml. The number of FE were 200 fisheyes as 100 μm or more and 6,000 fish eyes as less than 100 μm.

Comparative Example 9

Propylene was polymerized by the procedures described in Comparative Example 5, but using 2.0 mg of rac-dimethylsilyl(2,4-dimethylcyclopentadienyl((3',5'-dimethylcyclopentadienyl)zirconium dichloride instead of 1.0 mg of (1R,2R)-1,2-dimethylethylidiylbis(2'-methylbenz [e]indenyl)zirconium dichloride. No adhesion or fouling of the polymer in the polymerization was described at all on the inner wall, stirrer blade and shaft of the autoclave. The polymer yield was 30 g. The obtained polymer had an inherent viscosity [η] of 1.26 dl/g, Tm of 149° C., and bulk density of 0.36 g/ml. The number of FE were 300 as 100 μm or more and 9,000 fisheyes as less than 100 μm.

Example 13

[Preparation of organic aluminum oxy compound supported on high molecular compound(F)]

In 1 liter glass autoclave which was sufficiently replaced with nitrogen, 1.0 g of maleic anhydride grafted polypropylene (Mw: 43500, maleic anhydride content: 6.7 wt %, 0.68 mmol/g) was suspended in 400 ml of xylene, heated at 130° C. and completely dissolved. 7 ml of a toluene solution containing methylaluminoxane (manufactured by Albemarle Co., methylaluminoxane content of 8 wt. %) was added via syringe under nitrogen and heated at 145° C. for 4 hours. The reaction mixture was cooled to 40° C., and sprayed through a flat spray nozzle into 3 liters of hexane by the nitrogen pressure at 3 kg/cm². The precipitate was filtered under nitrogen, rinsed successively with 400 ml of toluene, 200 ml of hexane, and then dried in vacuo to give 1.2 g of pale yellow fine powdery solid. The solid component had 4.3 mmol/g as aluminum content.

[Polymerization of propylene]

Propylene was polymerized by the procedures described in Example 5, but using 240 mg of the above pale yellow solid catalyst component (E) instead of the solid catalyst component (F). No adhesion or fouling of the polymer in the polymerization was observed at all on the inner wall, stirrer blade and shaft of the autoclave. The polymer yield was 600 g. The obtained polymer had an inherent viscosity [η] of 1.26 dl/g, Tm of 134° C., and bulk density of 0.38 g/ml. The number of FE were 4 fisheyes as 100 μm or more and 10 fish eyes as less than 100 μm.

[Effect of the invention]

By applying the catalyst system of the invention, olefin can be polymerized in high activity and polymer having high stereoregularity can be obtained. Further, adhesion or fouling of the polymer or organic aluminum oxy compound in the polymerization, is not caused on the inner wall of the reactor. The polymer has a high bulk density and the product processed articles have very few fisheyes or gel. Consequently, high productivity can be maintained, high quality product can be manufactured, and very high contribution is expected in industry.

What is claimed is:

1. A catalyst composition capable of catalyzing olefin polymerization comprising an organic transition metal compound and a separate support, the organic transition metal compound being soluble in an inert organic solvent, the support being insoluble in the inert organic solvent, said support comprising an organic compound which contains a carbonyl-containing group represented by the formula [1]:

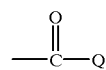

[1]

wherein Q is selected from the group consisting of hydrogen, hydroxy, alkyl, aryl, alkoxy, aryloxy, oxycarbonyl, halogen, amino, aminocarbonyl, hydrazino and oxyanion, and being obtained by contacting and chemically bonding the organic compound containing the carbonyl-containing group represented by the formula [1] with an organic aluminum oxy compound.

2. The catalyst composition according to claim 1 wherein the support being insoluble in the inert organic solvent is prepared by heat-dissolving the organic compound containing the carbonyl-containing group represented by the formula [1] in the organic solvent and contacting the organic compound with the organic aluminum oxy compound.

3. The catalyst composition according to claim 1 wherein the organic aluminum oxy compound is at least one compound selected from compounds represented by formula [4] or formula [5]

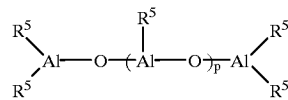

[4]

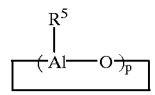

[5]

wherein $R^5$ is the same or different and is an alkyl of 1–6 carbon atoms, aryl of 6–18 carbon atoms, or hydrogen and p is an integer of 2–50.

4. The catalyst composition according to claim 1 wherein the composition further comprises an organic metal compound as a catalyst component.

5. The catalyst composition according to claim 4 wherein the organic metal compound is a compound of metal selected from group 1, 2, 12 or 13 of the periodic table.

6. The catalyst composition according to claim 1 wherein the organic transition metal compound being soluble in the inert organic solvent is a metallocene compound.

7. The catalyst composition according to claim 6 wherein the metallocene compound is a compound selected from the formula [2] or formula [3]

[2]

wherein $A^1$ and $A^2$ are a cyclopentadienyl group, indenyl group, or fluorenyl group, one of $A^1$ and $A^2$ can be amino group, and two adjacent groups can be directly bonded to each other to form a cyclic hydrocarbon substituent; a portion or all of the hydrogen atoms on these groups can be substituted with a substituent selected from the group consisting of alkyl having 1–20 carbons atoms, aryl having 6–20 carbon atoms, alkoxy having 1–20 carbon atoms, aryloxy having 6–20 carbon atoms and silicon containing alkyl having 1–20 carbon atoms; M is a metal of group 4 in the periodic table; and $X^1$ and $X^2$ are selected from the group consisting of halogen, alkyl having 1–20 carbon atoms and anion ligand

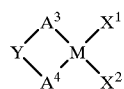
[3]

wherein $A^3$ and $A^4$ are a cyclopentadienyl group, indenyl group, or fluorenyl group, one of $A^3$ and $A^4$ can be an amino group, and two adjacent groups can be directly bonded each other to form a cyclic hydrocarbon substituent; a portion or all of the hydrogen atoms on these groups can be substituted with a substituent selected from the group consisting of alkyl having 1–20 carbon atoms, aryl having 6–20 carbon atoms, alkoxy having 1–20 carbon atoms, aryloxy having 6–20 carbon atoms and silicon-containing alkyl having 1–20 carbon atoms; $A^3$ and $A^4$ is the same or differ from each other; M is a metal of group 4 in the periodic table; Y is selected from the group consisting of —$CR^1R^2$—, —$CR^1R^2$—$CR^3R^4$—, and $SiR^1R^2$— wherein $R^1$, $R^2$, $R^3$ or $R^4$ are selected from the group consisting of hydrogen, alkyl having 1–20 carbon atoms, aryl having 6–20 carbon atoms, alkoxy having 1–20 carbon atoms, aryloxy having 6–20 carbon atoms and silicon-containing alkyl having 1–20 carbon atoms, and $R^1$, $R^2$, $R^3$ and $R^4$ are the same or differ from each other; $X^1$ and $X^2$ are selected from the group consisting of halogen, alkyl having 1–20 carbon atoms and anion ligand.

8. The catalyst composition according to claim 1 wherein the organic compound which contains a carbonyl-containing group is obtained by grafting or graft polymerizing an unsaturated compound containing a carbonyl-containing group represented by formula [1] on a polyolefin.

9. The catalyst composition according to claim 8 wherein the unsaturated compound containing a carbonyl-containing group represented by formula [1] is an unsaturated organic acid anhydride.

\* \* \* \* \*